(12) United States Patent
Meins et al.

(10) Patent No.: US 7,310,540 B2
(45) Date of Patent: Dec. 18, 2007

(54) PERSONAL COMMUNICATOR WITH FLIP ELEMENT DISPLAY

(75) Inventors: Charlene L. Meins, Seattle, WA (US); Jordan M. Roderick, Redmond, WA (US); Michael F. Buhrmann, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 783 days.

(21) Appl. No.: 10/455,125

(22) Filed: Jun. 5, 2003

(65) Prior Publication Data

US 2003/0211872 A1 Nov. 13, 2003

Related U.S. Application Data

(63) Continuation of application No. 08/979,110, filed on Nov. 26, 1997, now Pat. No. 6,587,700, which is a continuation of application No. 08/741,463, filed on Oct. 31, 1996, now abandoned, which is a continuation of application No. 08/349,032, filed on Dec. 2, 1994, now abandoned, which is a continuation-in-part of application No. 29/024,955, filed on Jun. 23, 1994, now Pat. No. Des. 363,281.

(51) Int. Cl.
*H04M 1/00* (2006.01)

(52) U.S. Cl. ............... 455/575.1; 455/90.1; 455/550.1

(58) Field of Classification Search ............ 455/575.1, 455/575.3, 575.8, 90.1–90.3, 550.1
See application file for complete search history.

(56) References Cited

U.S. PATENT DOCUMENTS

| | | | |
|---|---|---|---|
| D298,036 S | 10/1988 | Watanabe | |
| 4,845,772 A | 7/1989 | Metroka et al. | |
| D306,298 S | 2/1990 | Sawada et al. | |
| D319,441 S | 8/1991 | Konno et al. | |
| D328,294 S | 7/1992 | Stilley | |
| 5,175,759 A | 12/1992 | Metroka et al. | |
| 5,185,790 A | 2/1993 | Mischneko | |
| 5,260,998 A | 11/1993 | Takagi | |
| 5,285,493 A | 2/1994 | Wagai et al. | |
| D345,355 S | 3/1994 | Konno et al. | |
| D345,356 S | 3/1994 | Ando et al. | |

(Continued)

FOREIGN PATENT DOCUMENTS

JP 4-002223 1/1992

(Continued)

OTHER PUBLICATIONS

Simon Personal Communicator (9 pages), 1993-1994.*

*Primary Examiner*—Eliseo Ramos-Feliciano
*Assistant Examiner*—Wayne Cai
(74) *Attorney, Agent, or Firm*—Michael J. Donohue; Davis Wright Tremaine LLP (57) ABSTRACT

A portable personal communicator includes a body portion and a flip element having a built-in display. The body portion includes either a telephone keypad or a second display. The personal communicator functions as a radiotelephone, and can also transmit and receive non-voice data messages. Input keys on the flip element are provided proximate to the flip element display so that software-definable functions performed by the keys can be indicated on the display adjacent to the respective keys.

20 Claims, 5 Drawing Sheets

U.S. PATENT DOCUMENTS

D348,071 S    6/1994   Siddoway et al.
D351,594 S   10/1994   Tsoi
5,414,444 A *  5/1995  Britz .......................... 345/156
6,587,700 B1 * 7/2003  Meins et al. ............. 455/575.8

FOREIGN PATENT DOCUMENTS

JP          6-164440     *   6/1994

* cited by examiner

PERSONAL COMMUNICATOR WITH FLIP ELEMENT DISPLAY

This application is a continuation of application Ser. No. 08/979,110 filed on Nov. 26, 1997, now U.S. Pat. No. 6,587,700 which is continuation of application Ser. No. 08/741,463 filed Oct. 31, 1996, now abandoned, which is a continuation of application Ser. No. 08/349,032 filed on Dec. 2, 1994 now abandoned, which is a continuation-in-part of application Ser. No. 29/024,955, filed Jun. 23, 1994 now U.S. Pat. No. Des. 363,281, issued Oct. 17, 1995, to Michael F. Buhrmann.

FIELD OF THE INVENTION

This invention relates generally to portable radiotelephones for use in a wireless communication system, and more particularly to a personal communicator that has radiotelephone and data-message handling capabilities.

BACKGROUND OF THE INVENTION

In today's competitive business environment it is becoming increasingly important for business people to have access to a personal communications network at all times. Accordingly, portable radiotelephones, such as cellular telephones and cordless telephones, have become commonplace.

One popular variety of radiotelephone has two main housing elements connected by a hinge, allowing the telephone to be folded into a compact "closed" configuration when it is not in use, and to be unfolded into an "open" configuration when it is in use. The larger of the two housing elements, hereinafter referred to as the "body portion," normally contains most of the electronics required for operation of the radiotelephone. The smaller housing element, hereinafter referred to as the "flip element," normally contains at most a microphone and a ringing element. Radiotelephones of this type are described in U.S. Pat. Nos. 4,845,772 and 5,185,790.

Radiotelephones of the flip element type provide a compact means to access voice communications virtually anywhere. Often, however, business people have the need to access information that is not available over the telephone or that cannot be easily-or efficiently communicated in a telephone conversation. For example, a person may have the need to send or receive text messages, access remote databases, or access a directory of addresses and telephone numbers of business associates. Heretofore, radiotelephones of the flip element type have not provided a satisfactory means for their users to access, send or receive non-voice information. Consequently, radiotelephone users have had to make use of separate devices for these purposes, such as facsimile machines, portable personal computers, electronic personal organizers and personal digital assistants.

While some radiotelephones of the flip element type have included a visual display, such as the telephones disclosed in U.S. Design Pat. Nos. 298,036 and 337,763, these radiotelephones have heretofore incorporated the display on the body portion of the device. Because much of the surface area of the body portion is used for various required elements of the telephone (such as a keypad, an earpiece, on/off and volume switches, etc.), the display is typically made small in order to preserve the compact size of the unit. Consequently, only a small amount of information can be presented to the user at a time, limiting the use of the display to relatively rudimentary functions such as the display of a single telephone number. Such small displays cannot be used effectively for more advanced communications functions that require presentation of relatively large amounts of visual information.

Therefore, a new radiotelephone is needed that provides a larger visual display with enhanced features, and the capability to send, receive, and store non-voice information.

SUMMARY OF THE PREFERRED EMBODIMENTS

It is therefore an object of the present invention to provide a portable radiotelephone having a body portion, a telephone keypad incorporated into the body portion, a flip element, and a display incorporated into the flip element so that the user of the radiotelephone can send, receive, and view data messages.

It is another object of the present invention to provide a portable radiotelephone having a body portion with a first built-in display, and a flip element portion with a second built-in display, wherein at least one of the two displays is touch-sensitive.

Accordingly, these and other objects are realized in the present invention which encompasses a portable radiotelephone (referred to herein as a "personal communicator") that has a display built into the flip element. In a first embodiment, the personal communicator has a single display that is disposed on the flip element and a conventional telephone keypad that is located on the body portion. The personal communicator further comprises memory and processing circuitry to permit the execution of conventional communications application programs. The display may be either touch-sensitive or non-touch-sensitive, and is preferably activated when the flip element is folded to an open position.

The display may be used to display text or graphics that is received by the personal communicator under the control of a communications application program. For example, the display may be used to display short message service (SMS), beeper, E-Mail or facsimile messages. The display, may also be used to display status information for communications application programs. The display may also be used to permit the user to select among a plurality of menu options. For embodiments that use a touch-sensitive display, menu items can be selected by pushing on selected areas of the screen. For embodiments that do not use a touch-sensitive display, menu items can be selected by pushing keys that are provided on the flip element adjacent to the display, the functions of which may be indicated on the display. The telephone keypad may be used to place telephone calls over a cellular network, and may be used in conjunction with communications application programs.

In a second embodiment, the personal communicator has a first display on the flip element, and has a second display on the body portion (in place of the conventional telephone keypad of the first embodiment). One or both displays may be touch-sensitive. A telephone keypad can be displayed on the touch-sensitive display (or displays) under the control of software, to permit the user to dial a telephone number without the need for a push-button keypad. The displayed keypad can be removed from the screen when not in use, providing a larger total display area for viewing messages.

BRIEF DESCRIPTION OF THE DRAWINGS

The present invention will be better understood when read in light of the accompanying drawings in which.

DETAILED DESCRIPTION OF THE PREFERRED EMBODIMENTS

Figure 4:
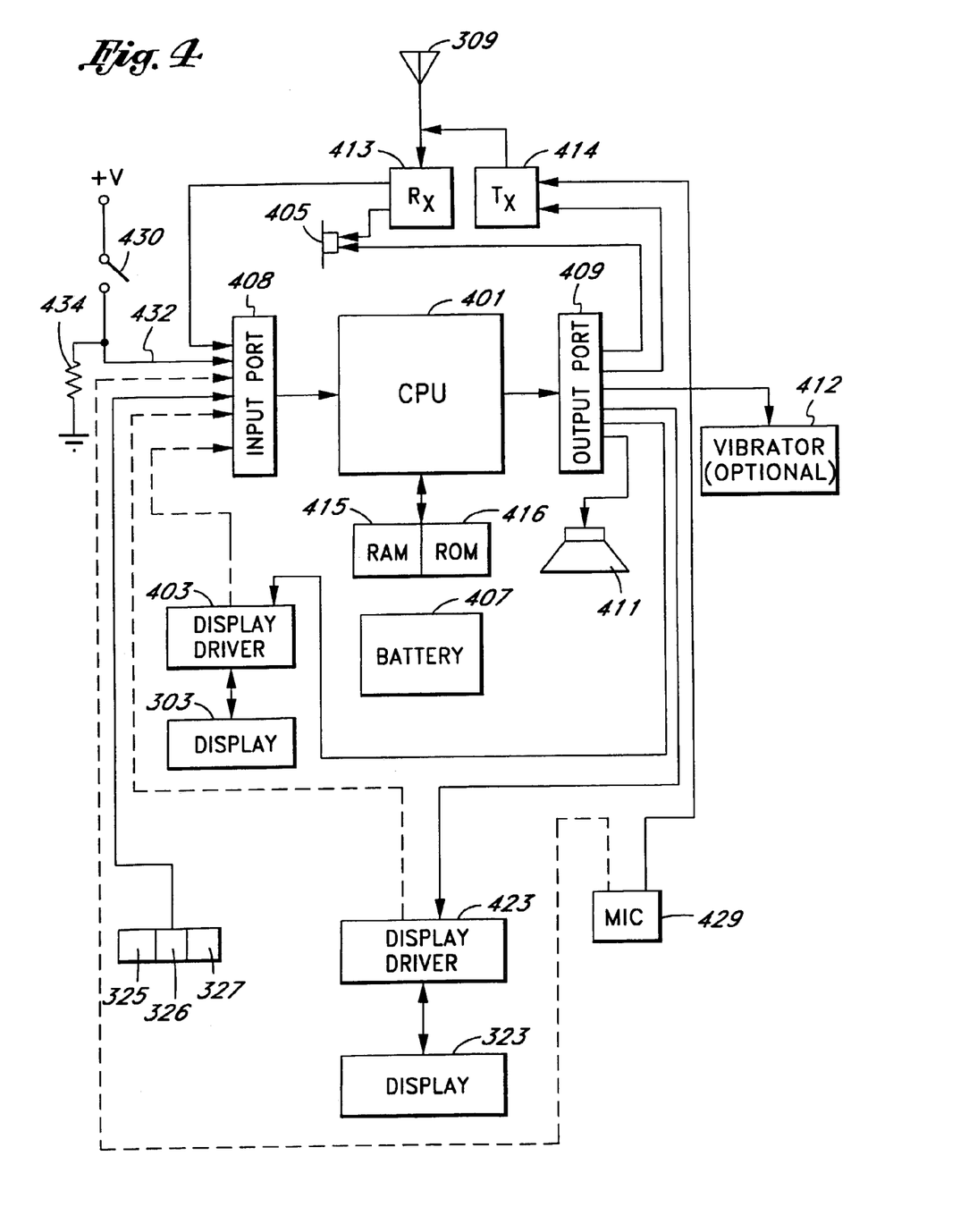
FIG. 4 is a block diagram of the circuitry of the personal communicator shown in FIG. 3.
Figure 5:
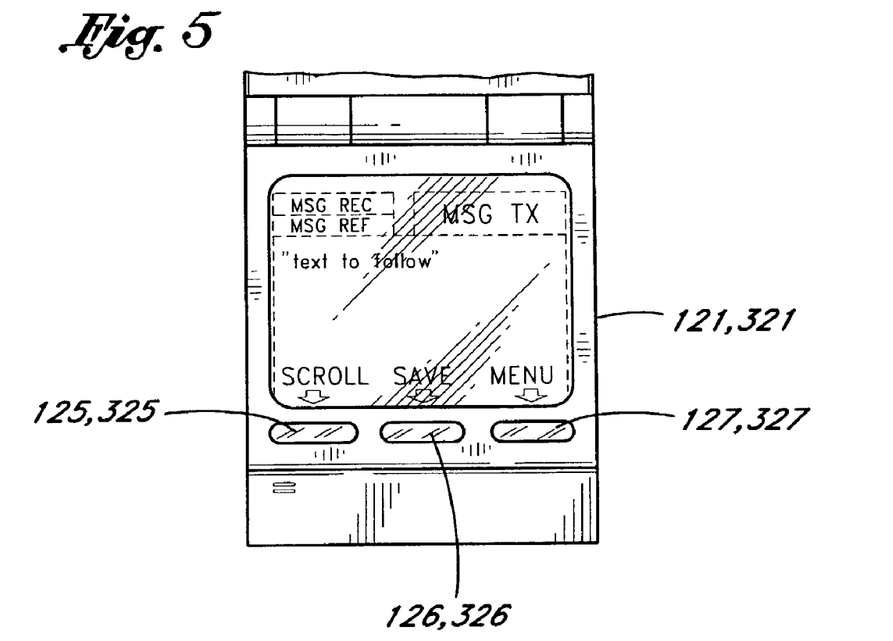
FIG. 5 is a front plan view of the flip element of either of the personal communicators shown in FIGS. 1 and 3, showing an example display output that indicates functions performed by input keys on the flip element.
Figure 6:
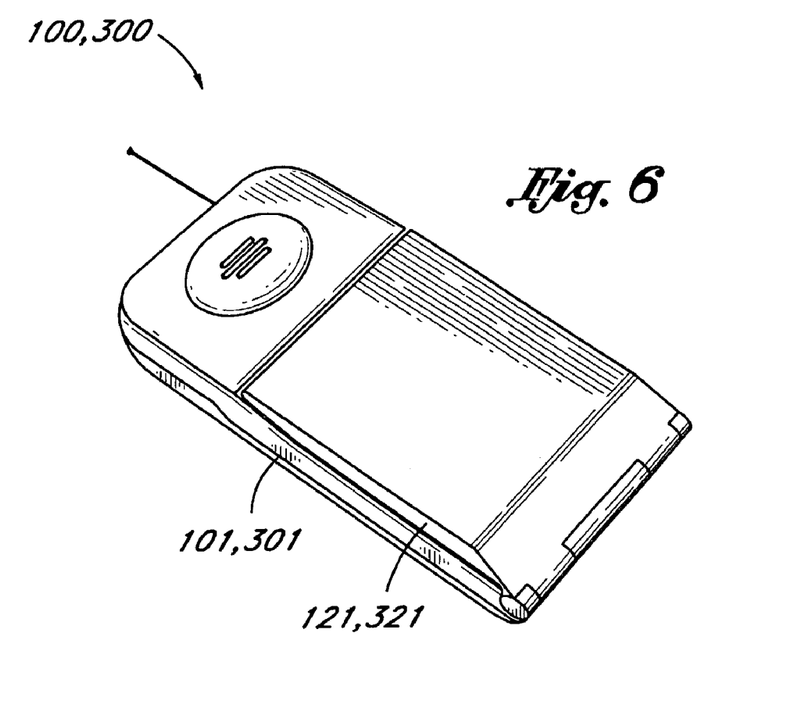
FIG. 6 is a perspective view of either of the personal communicators shown in FIGS. 1 and 3, showing the personal communicator in a compact, folded configuration.
Figure 7:
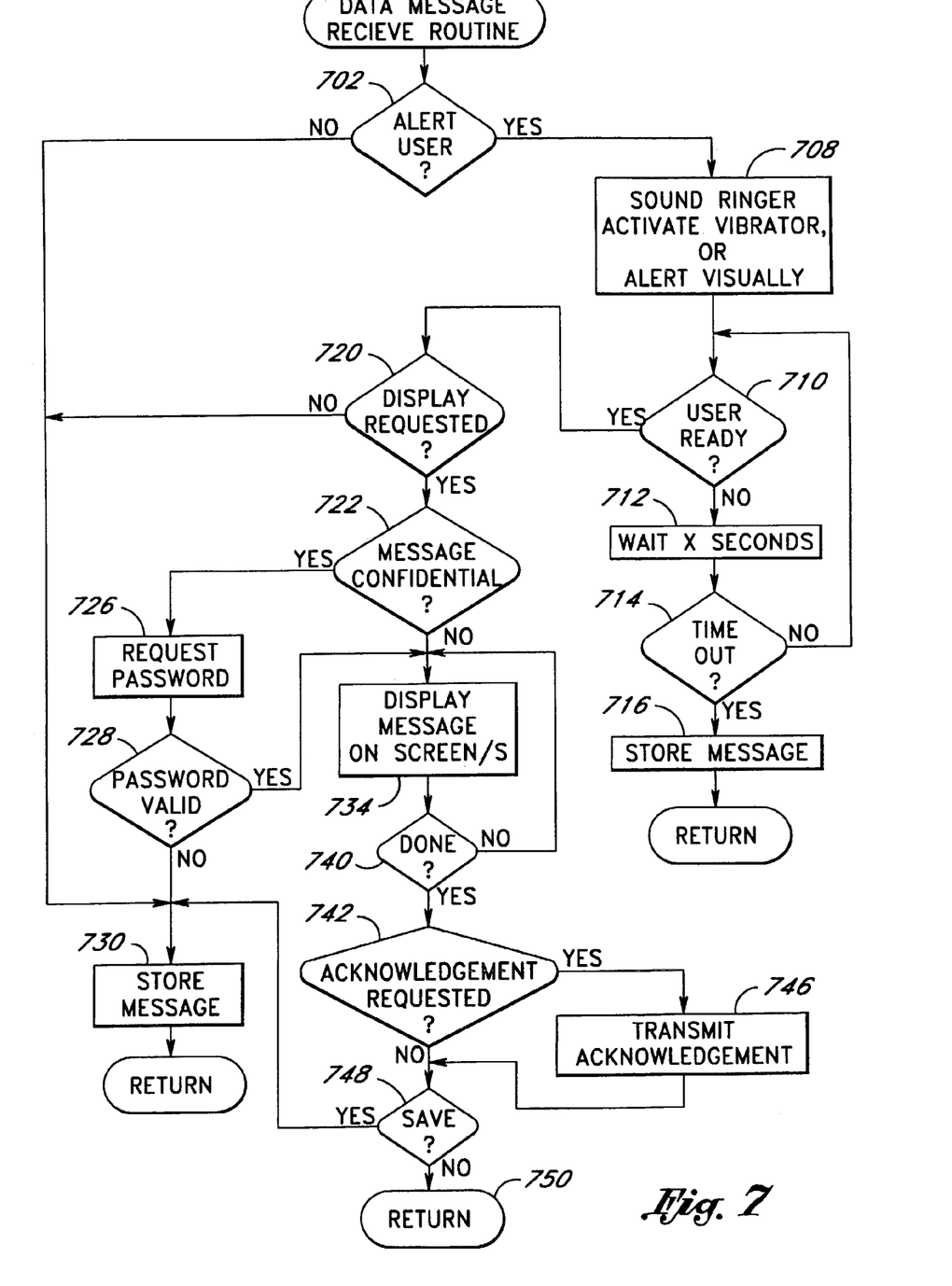
FIG. 7 is a high level flowchart illustrating a process that is performed when a personal communicator receives a data message.

Two preferred embodiments of the present invention are described in detail below. A first embodiment, shown in FIGS. 1 and 2, comprises a portable radiotelephone having a telephone keypad on the body portion with and display on the flip element. A second embodiment, shown in FIGS. 3 and 4, comprises a portable radiotelephone having a first display on the body portion a second display on the flip element. FIGS. 5, 6 and 7 are applicable to both radiotelephone embodiments.

Both radiotelephones have data message handling capabilities, permitting users to send and receive data messages, such as textual messages provided in accordance with a short message service (SMS) standard. In accordance with this aspect of the present invention, the radiotelephones will hereinafter be referred to as "personal communicators."

Figure 1:
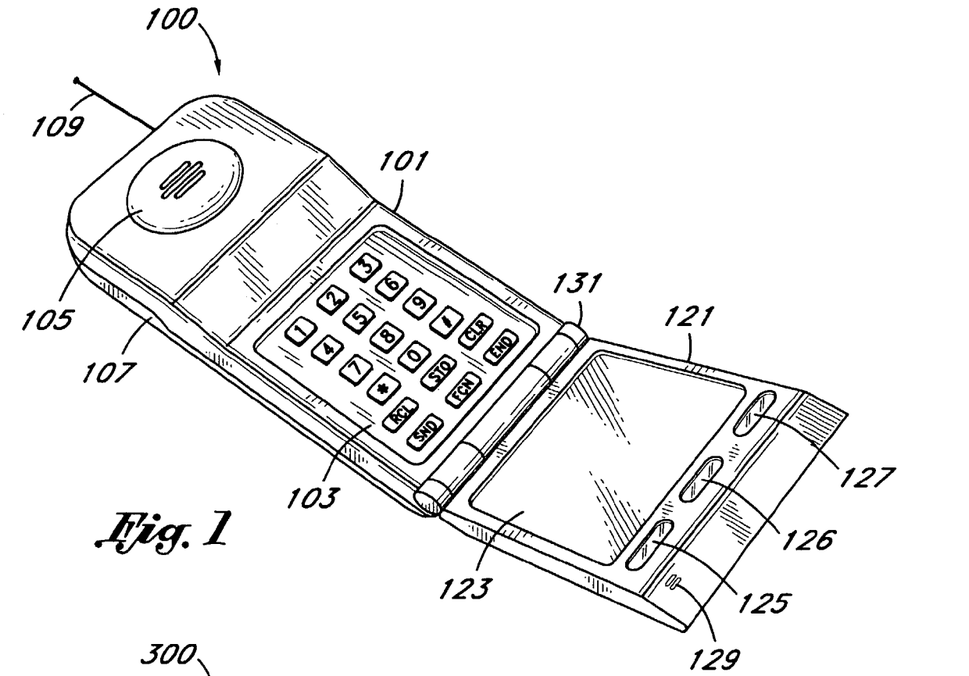
FIG. 1 is a perspective view of a personal communicator constructed in accordance with a first embodiment of the present invention, showing a display on the flip element of the device.
Figure 2:
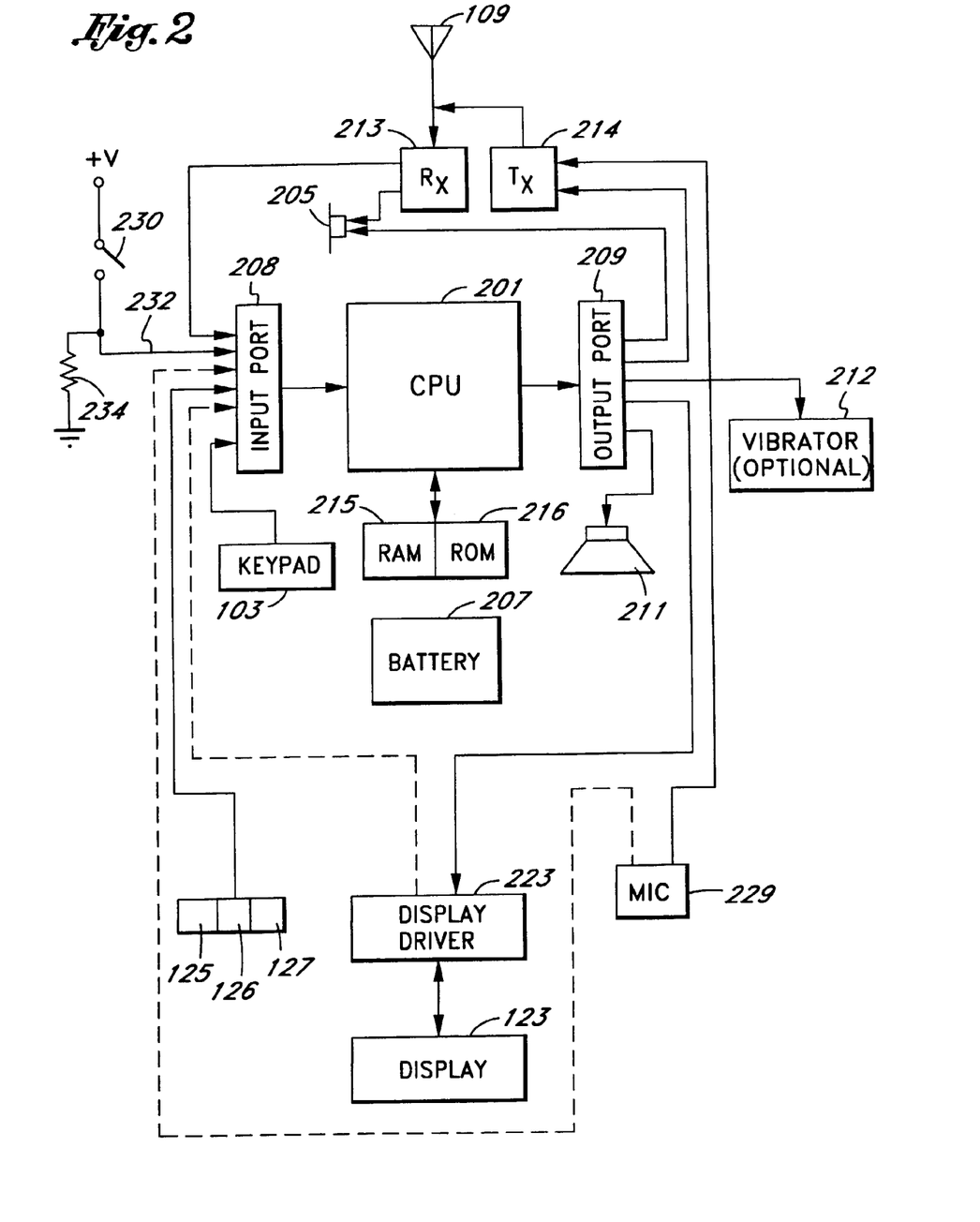
FIG. 2 is a block diagram of the circuitry of the personal communicator shown in FIG. 1.

A portable, personal communicator 100 according to a first embodiment of the present invention is shown in FIG. 1. A block diagram of the internal circuitry of the personal communicator 100 is shown in FIG. 2. Referring first to FIG. 1, the personal communicator 100 has two main portions, a body portion 101 and a flip element 121. The body portion 101 and the flip element 121 are connected by a hinge 131. The body portion 101 is configured for placement to the ear of a user. Further, the body portion 101 and the flip element 121 are positioned relative to one another such that a user of the personal communicator 100 may place an ear against an earpiece 105 and may speak into a mouthpiece 129 when the flip element 121 is in an open angular position (as shown in FIG. 1).

A keypad 103 is provided on the body portion 101. The keypad 103 includes standard telephone number dialing keys (labeled 0-9, * and # in FIG. 1), and additional keys to facilitate wireless telephone communications. Additional keys or switches (not shown) may be provided to perform functions such as power on/off, channel select, volume control, and telephone number recall. The personal communicator 100 may also include various adapter outlets (not shown), such as an AC power adapter outlet, an audio outlet for headphones, or a communications adapter outlet for direct communications between the personal communicator 100 and a personal computer. A rechargeable battery pack, the location of which is generally shown at 107, enables the personal communicator 100 to be recharged, for example, by mechanically coupling a charging contact (not shown) on the battery pack 107 to a base station (not shown). An antenna 109 enables wireless communication between the personal communicator 100 and other devices in a communications network.

When the flip element 121 is open as shown in FIG. 1, a built-in display 123 is visible to a user of the personal communicator 100. The display 123 may be a conventional LCD or plasma display, or another type of lightweight, lower-power display. The display 123 advantageously provides various types of visual information to the user of the personal communicator 100, such as alphanumeric text, or graphic or video images. The flip element 121 also includes input keys 125, 126, and 127 to allow a user to input information into the personal communicator 100.

The display 123 may be used for output only, in which case user input is accomplished primarily through the use of the input keys 125, 126, and 127 and the keypad 103. However, the display 123 is preferably a conventional touch sensitive display, such as a DMF series LCD Touch Screen available from Optrex, that can be used for input as well as output. The use of a touch sensitive display enables the user to input information by touching menu items presented on the display 123. In an alternative embodiment, a user can additionally or alternatively input information by writing on the display 123 with a stylus (not shown). A conventional character recognition means can advantageously be included to facilitate input of information using the stylus. In addition to the above-mentioned sources of user input, the personal communicator 100 may be configured to accept and process an audio input, in which case the personal communicator 100 may be equipped with a voice recognition capability.

Referring to FIG. 2, a block diagram of the internal circuitry of the personal communicator 100 is shown, with arrows indicating the direction of information flow between the various electrical components of the personal communicator 100. A central processing unit ("CPU") 201 is connected to an input port 208 and an output port 209. The CPU 201 is also connected to non-volatile random access memory ("RAM") 215 and read-only memory ("ROM") 216. As will be recognized by those skilled in the art, one or more of the CPU 201, the input and output ports 208 and 209, the RAM 215 and the ROM 216 may be integrated into a conventional microprocessor, microcontroller, or application-specific integrated circuit (ASIC). It will further be recognized that multiple CPU's can be provided, with, for example, one or more CPU's acting as a slave to a master CPU.

Connected to the input port 208 are the keypad 103, the input keys 125, 126, and 127, a receiver ("Rx") 213, and a switch 230. The switch 230 is connected between a line 232 and a voltage source (+V), such that the line 232 is held high (at approximately +V volts) when the switch is closed. A pull-down resistor 234 pulls the line 232 to ground when the switch 230 is open. The switch 230 is preferably formed within a hinge portion 131 of the personal communicator 100 such that the switch 230 transitions between an open and a closed state as the flip element 121 is pivoted past a predetermined angular position relative to the body portion 101. The switch 230 may be a contact switch, hook switch, magnetically activated switch, or other device conventionally used for a similar purpose. The switch 230 is used by the CPU 201 to activate the display 123 when the flip element 121 is folded to an open position, and may further be used to switch the personal communicator 100 between various modes (modes discussed below).

Connected to the output port 209 are a speaker 205, an optional mechanical vibrator 212 for alerting a user, a transmitter ("Tx") 214, a display driver 223, and a ringer 211. The display driver 223 is connected to the display 123. If the display 123 is a touch sensitive display, the display driver 223 is also connected to the input port 208, as shown by a dashed line in FIG. 2. The speaker 205 is situated proximately behind the earpiece 105 so that the user of the personal communicator 100 is able to hear the sounds generated by the speaker 205. In addition to being connected to the input port 208, the receiver 213 is connected to the antenna 109 and to the speaker 205. The transmitter 214, in addition to being connected to the output port 209, is connected to the antenna 109 and to a microphone (MIC) 229. The microphone 229 is situated proximately behind the mouthpiece 129 (FIG. 1) in order to pick up the voice of the user of the personal communicator 100. If the personal communicator 100 is equipped to accept and process audio input, the microphone 229 is also connected to the input port 208, as shown by a dashed line in FIG. 2.

A battery 207 provides the electrical power necessary to operate the various electrical components of the personal communicator 100. While the actual electrical connections of the battery 207 are not shown in FIG. 2, conventional means are employed to supply electrical power from the battery 207 to the various electrical components of the personal communicator 100.

The type of information that the CPU 201 outputs to, or inputs from, the display 123 depends on the software which the CPU 201 is executing at a given time. Software application programs may be loaded into RAM 215 from ROM 216 or from another type of non-volatile storage device (not shown), such as a flash memory card or a miniature disk drive that is mounted within or interfaced to the personal communicator 100. Application programs may also be transmitted to the personal communicator 100 from a remote storage device, or "downloaded" directly to the personal communicator 100, for example, via a communications adapter that links the personal communicator 100 to a personal computer. Once an application program is loaded into RAM 215, the program may be executed by the CPU 201. Applications may be executed partially by the CPU 201 and partially by remote processing means operating in a "client/server" relationship, allowing the personal communicator 100 to access greater storage and processing resources than are available within the personal communicator 100 itself. Once executed, an application program has access to all of the I/O devices to which the CPU 201 is interfaced. For example, an application can send and receive radio frequency signals via the receiver 213 and the transmitter 214, can input and output audio information via the microphone 229 and the speaker 205, can input information from the keypad 103 and the input keys 125, 126, and 127, and can output visual information to, and input visual information from, the display 123.

The personal communicator 100 is advantageously suitable for a variety of communications applications. The display 123 may be used to display message data received under the control of an application program. For example, the display 123 can be used to display short message service (SMS) messages that are in accordance with an SMS standard published by the CCITT. The display 123 can also be used to display fax messages, e-mail massages, beeper messages, and other types of messages sent in accordance with conventional communications protocols. The display 123 can further be used to display status information for the personal communicator 100 and for application programs that are being executed, and to allow the user to select from a plurality of menu options. For embodiments that use a touch sensitive display, the display 123 may also be used to compose data message, in which case an alphanumeric keypad may be shown on the display 123. The display 123 can further be used to display directories of names and phone numbers stored in RAM 215. For embodiments that use a touch sensitive display 123, displayed telephone numbers can further be selected for dialing by depressing a corresponding portion of the display 123.

The telephone keypad 103 may be used to place telephone calls, including voice telephone calls and calls placed to initiate data communications. The telephone keypad 103 may further be used (with a template or otherwise) to allow a user to generate a data message to send. The telephone keypad 103 may further be used to allow a user to enter a password to access certain types of data messages.

Preferably, when the flip element 121 is in the closed position (as shown in FIG. 6), the personal communicator 100 operates in a "voice communications receive mode," wherein the personal communicator 100 can receive incoming cellular phone calls but cannot accept data messages. In an alternative embodiment, the personal communicator 100 is configured to accept both telephone calls and data messages when the flip element 121 is in the closed position.

In the voice communications ready mode, the personal communicator 100 can alert a user to an incoming telephone call by activating the ringer 211 or the vibrator 212. The personal communicator 100 optionally may be programmed to execute a voice mail application to record the caller's voice message in RAM 215 immediately or after a preprogrammed number of rings. The display 123 is maintained in an off state when the flip element 121 is closed, to conserve power.

When the flip element 121 is in an open position, the personal communicator 100 is preferably switchable between a "voice mode," a "display mode," and a "dual mode," as specified by the user. The mode that the personal communicator 100 "comes up" in when the flip element 121 is initially opened may be pre-specified by the user. In the voice mode, the personal communicator 100 operates like a standard radiotelephone, allowing a user to dial telephone numbers, answer incoming telephone calls, and carry on telephone conversations. The components of the personal communicator 100 that are not required for voice communications, such as the display 123, are advantageously turned off or maintained in a low-power state while the personal communicator 100 operates in the voice mode. In the display mode, the display 123 is active, allowing the user to select a function from a menu of options that allow the user to interact with software application programs. For example, the user can select between menu items that allow the user to create a data message, send a data message, or view a data message previously stored to RAM 215. Menu options can be selected using the keys 125, 126 and 127. As illustrated in FIG. 6, which illustrates a sample menu on the display 123, the keys 125, 126 and 127 preferably serve functions that are software-definable, with portions of the display 123 proximate to the keys 125, 126, 127 indicating the functions performed by the respective keys. For example, when the user is viewing a received data message, the key 125 may be defined as a scroll key which permits the user to scroll forward through the displayed message. For embodiments that include a touch-sensitive display, menu items may additionally or alternatively be selected by depressing a portion of the display 123.

The dual mode is a combination of the voice and display modes. The dual mode advantageously allows a user to interact with software application programs while simultaneously carrying on a telephone conversation. To facilitate operation in the dual mode, the personal communicator 100 may be equipped with a headphones socket (not shown) and/or a "speakerphone" capability, so that a user can simultaneously hear another party's voice, view the display 123, and input information into the personal communicator 100.

Switching between the various operating modes available when the flip element 121 is open is preferably accomplished manually by a user, for example, by the use of one or more of the keys 125, 126, 127 on the personal communicator 100. Mode switching may also be accomplished automatically in response to particular events. For example, when an incoming telephone voice call is answered, such as by the user opening the flip element 121, the personal communicator 100 may automatically enter voice mode. Additional operating modes may be utilized in order to obtain the best combination of ease-of-use and long battery life for the personal communicator 100.

The personal communicator 100 may alert a user to an incoming telephone call or data message audibly using the ringer 211, visually using the display 123 (when the display 123 is active), or physically using the vibrator 212. The specific means used to alert the user can be preprogrammed by the user. Further, the personal communicator 100 can be configured such that the particular means used to alert the user indicates the type of communication being received (e.g., telephone call, data message, emergency data message, fax, etc.).

Figure 3:
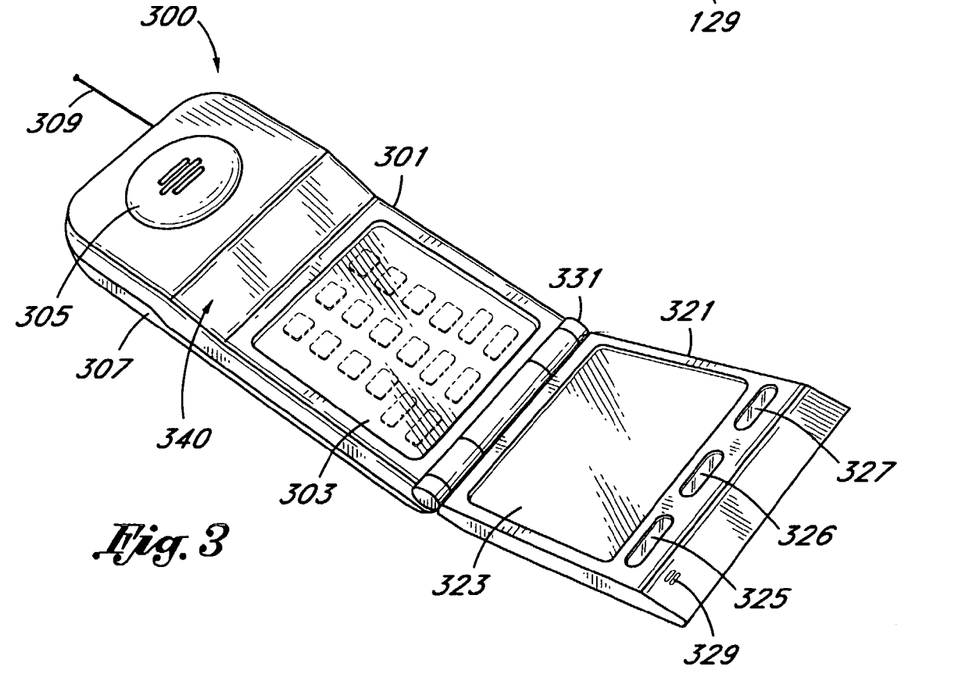
FIG. 3 is a perspective view of a personal communicator constructed in accordance with a second embodiment of the present invention, showing displays on the body portion and on the flip element of the device.

A portable personal communicator 300 according to a second embodiment of the present invention is shown in FIG. 3. A block diagram of the internal circuitry of the personal communicator 300 is shown in FIG. 4. Referring first to FIG. 3, the personal communicator 300 has a body portion 301, an earpiece 305, a rechargeable battery pack shown generally by 307, an antenna 309, a flip element 321, input keys 325, 326 and 327, a mouthpiece 329, and a hinge 331 that are preferably substantially identical to the body portion 101, earpiece 105, rechargeable battery pack 107, antenna 109, flip element 121, input keys 125, 126 and 127, mouthpiece 129, and hinge 131 respectively described above for the personal communicator 100.

A first display 303 is disposed on the body portion 301, in place of the keypad 103 of FIG. 1. A second display 323 is disposed on the flip element 321. The first display 303 and the second display 323 may be conventional LCD or plasma displays, or other types of lightweight, lower-power displays. In the preferred embodiment, both displays 303 and 323 are DMF series LCD displays available from Optrex, with at least one of the two displays being touch sensitive. The first display 303 and the second display 323 may provide any type of visual information to the user of the personal communicator 300, such as alphanumeric text, graphics, or video images.

Preferably, the first display 303 is a touch sensitive display that can be used for both input and output of information. For example, when the personal communicator 300 is being used as a radiotelephone, the first display 303 may display a visual facsimile of a telephone keypad (as shown in dashed lines in FIG. 3), allowing a user to dial a telephone number by pressing a finger repeatedly on the surface of the display 303. The display 303 may also be employed in other ways to facilitate telephone number dialing. For example, the display 303 may present a directory of telephone numbers, allowing a user to dial a telephone number by simply touching a directory entry. Further, the personal communicator 300 may be equipped with a handwriting recognition capability, allowing a user to dial a telephone number by hand writing the number on the display 303 with a stylus.

If a non-touch sensitive display is used for the first display 303, some other means to input telephone numbers and other information is preferably provided. For example, the second display 323 may be a touch sensitive display that provides for input of data. Alternatively, the personal communicator 300 may be equipped with a voice recognition capability, so that a user of the personal communicator 300 may dial a telephone number by simply speaking into the mouthpiece 329.

The specific functions of the displays 303 and 323 depend on the specific implementation of the personal communicator 300, as well as on the software application being executed by the personal communicator 300. For example, both displays may be used for output, both for input, or either one of the displays 303 or 323 may be used for input while the other display is used for output. Advantageously, the addition of the second display 303 provides a greater display area for displaying received messages over the personal communicator 100 of FIG. 1. This facilitates the display of relatively long messages that are commonly encountered with certain types of communications applications. Further, with the use of two displays 303, 323, one display can be used to display messages while the other display is used to display menu items. Thus, for example, messages can be displayed on the display 303, while the display 323 displays menu items that allow the user to scroll through the displayed message, zoom-in on the message (with facsimile messages, for example), edit the displayed message, or save the message to memory.

As will be recognized by those skilled in the art, the provision of two displays, at least one of which is touch-sensitive, opens up a wide range of possibilities. For example, a terminal emulation program may display a visual facsimile of a conventional "QWERTY" typewriter keyboard on the first display 303 while displaying a user-input text message (input using the QWERTY typewriter keyboard) on the second display 323. Or, a voice mail application may display a menu of options for managing voice messages on the first display 303, while the second display 323 displays helpful information regarding the voice mail options displayed on the first display 303.

Referring to FIG. 4, a block diagram of the internal circuitry of the personal communicator 300 is shown, with arrows indicating the direction of information flow between the various electrical components of the personal communicator 300. A CPU 401 is connected to an input port 408 and an output port 409. The CPU 401 is also connected to a nonvolatile RAM 415 and a ROM 416. Connected to the input port 408 are the input keys 325, 326, and 327, a switch 430, and a receiver ("Rx") 413. The switch 430 is connected between a line 432 and a voltage source (+V). A pull-down resistor 434 is connected between the line 432 and ground. The switch 430, input keys 325, 326, 327, and receiver 413 are structurally and functionally substantially identical to the switch 230, input keys 125, 126, 127, and receiver 213 of FIG. 2.

Connected to the output port 409 are a speaker 405, an optional mechanical vibrator 412, a transmitter ("Tx") 414, a first display driver 403, a second display driver 423, and a ringer 411. The vibrator 412 and transmitter 414 perform substantially the same functions as the vibrator 212 and transmitter 214 of FIG. 2. The first display driver 403 is connected to the first display 303, and the second display driver 423 is connected to the second display 323. If the first display 303 is a touch sensitive display, the first display driver 403 is connected to the input port 408, as represented by a dashed line in FIG. 4. If the second display 323 is a touch sensitive display, the second display driver 423 is also connected to the input port 408, as represented by a dashed line in FIG. 4. The speaker 405 is situated proximately behind the earpiece 305 so that the user of the personal communicator 300 is able to hear the sounds generated by the speaker 405. In addition to being connected to the input port 408, the receiver 413 is connected to the antenna 309 and to the speaker 405. The transmitter 414, in addition to being connected to the output port 409, is connected to the antenna 309 and to the microphone 429. The microphone 429 is situated proximately behind the mouthpiece 329 in order to pick up the voice of the user of the personal communicator 300. If the personal communicator 300 is equipped to accept and process audio input, the microphone 429 is also connected to the input port 408, as shown by a dashed line in FIG. 4.

The components of the personal communicator 300 serve the same or similar functions as the like-named components of the personal communicator 100. However, the personal communicator 300 of the second embodiment replaces the telephone keypad 103 of the first embodiment with the first display 303 and the first display driver 403, significantly increasing the total display area.

The various modes of operation for the dual-display personal communicator 300 are similar to those described above for the single-display personal communicator 100. Both displays 303 and 323 are turned off by the CPU 401 when the flip element 321 is closed. When the flip element 321 is open, one or both of the displays 303, 323 may be turned on by the CPU 401. Advantageously, one of the two displays 303 or 323 may be maintained in an off state by the CPU 401 when it is not needed, and may be automatically switched on only when an application requires additional display area. Power may thereby be conserved.

Referring to FIG. 5, the input keys 325, 326, and 327 are software definable, as with the keys 125, 126 and 127 of the personal communicator 100. Referring to FIG. 3, if a non-touch sensitive display is used for the display 303, additional software-definable keys (not shown) may be provided on the body portion 301 proximate to the display 303. For example, keys may be provided in the area generally indicated by the reference number 340.

FIG. 6 illustrates the configuration of either of the personal communicators 100 and 300 when the flip element 121, 321 is folded inward to meet with the body portion 101, 301. In addition to transforming the personal communicator 100, 300 to a compact state for easy storage, this method of closing the personal communicator advantageously serves to protect the display 123 (FIG. 1) or displays 303, 323 (FIG. 3) of the personal communicator 100, 300 from physical damage, while further serving to switch the displays 123, 303, 323 to an off state.

A description of some of the message handling capabilities of the personal communicators 100, 300 will now be provided. The personal communicators 100 and 300 preferably include software that permits data messages to be transferred over a cellular network in accordance with a short message service (SMS) standard. Various short message service are currently in use in Europe. Additionally, the CCITT is currently developing an SMS standard. Messages transmitted in accordance with a particular standard typically contain attributes that specify how the message should be treated by the personal communicator. For example a message may have a priority indicator (indicating, for example, priorities of "emergency," "urgent," "normal," and "interactive"), a time and date indicator (indicating the time and date the message was sent), a validity period indicator (indicating a period of time for which the message should be retained by the receiver), a privacy indicator (indicating, for example, whether or not the message is confidential), and an acknowledgement indicator (indicating whether the sending application requested an acknowledgement that the message was received). The implementation of a specific SMS standard is accomplished primarily through appropriate software.

FIG. 7 illustrates in a flow chart for a typical sequence of steps that are performed when a data message, such as a message transmitted in accordance with an SMS standard, is received by a personal communicator. The sequence of events is applicable to both of the above-described personal communicators 100 and 300, although the method by which each step is performed may differ.

Referring to the decision block 702, once a message is received, the personal communicator 100 or 300 will initially decide whether or not to alert the user. This decision may be based, for example, on the priority attribute of the message (if any), on the position flip element 121, 321, and on how the particular personal communicator 100 or 300 has been configured by the user. If a decision is made not to alert the user, the message may be stored to memory 215, 415, as indicated by the block 730. If a decision is made to alert the user, the personal communicator 100 or 300 will generate an audible tone from the ringer 211, 411, activate the mechanical vibrator 212, 412, or generate a visual display (such as a flashing icon) on a screen, as indicated by the block 708. The particular method for alerting the user preferably depends upon how the personal communicator 100 or 300 has been configured or preprogrammed by the user, and may also depend upon the type of message received.

Once the appropriate incoming message indicator has been made active, the personal communicator 100 or 300 will enter into a loop while waiting for the user to take an action, as indicated by the blocks 710, 712 and 714. The user may take an action in response to the incoming message, for example, by depressing one of the keys 125-127 or 325-327, or by depressing a portion of a touch sensitive screen 123, 303, or 323 that has an incoming message icon displayed thereon. Appropriate menu options may be provided at this time on one of the screens to indicate the various actions that can be taken (e.g., read-message, store message, etc.). If no action is taken within a preprogrammed timeout period, the message may automatically be transferred to memory 215, 415, as indicated by the blocks 714 and 716.

Referring to the decision blocks 720 and 722, if the user requests that the message be displayed, the personal communicator 100 or 300 may check to determine whether a confidentiality attribute is included within the message. If the message is confidential, the personal communicator 100 or 300 may prompt the user to enter a password, as indicated by the block 726. A password may be entered, for example, by depressing a sequence of numbers on the keypad 103 (FIG. 1), or by entering a sequence of characters displayed on a screen 123, 303, or 323. Access to the message will be denied if a correct password is not entered, as indicated by the blocks 728 and 730.

If the message is not confidential, or the message is confidential and the correct password has been entered, the message will be displayed, as indicated by the block 734. For the personal communicator 100 of FIG. 1, the message is displayed on the screen 123. For the personal communicator 300 of FIG. 3, the message may be displayed on one or both of the screens 303 and 323. A software-definable key 125-127 or 325-327, for example, may then be used to scroll through the message, or to select an appropriate option for handling the message (e.g., discard, store, forward, reply, etc.). For the personal communicator 300, one of the two screens 303 and 321 may advantageously be used for displaying these various options while the other screen is used to display the message.

Referring to the blocks 740 and 742, once the user is finished viewing the message, the personal communicator 100 or 300 may check an acknowledgement indicator attribute of the message. If an acknowledgement request is present, the personal communicator 100 or 300 transmits an acknowledgement message to the sender as indicated by the block 746, indicating that the message has been received and viewed. An acknowledgement message may alternatively be transmitted when the message is first received by the personal communicator 100 or 300. Finally, as indicated by the blocks 730, 748 and 750, the personal communicator 100 or 300 either discards the message or saves the message to RAM 215, 415, at the option of the user.

While particular embodiments of the present invention have been shown and described, it is to be understood that the invention is not limited to the specific embodiments described herein, and that changes and modifications may be made without departing from the true spirit of the invention. It is contemplated, therefore, to cover the present invention, and any and all such modifications thereto, by the appended claims.

What is claimed is:

1. A personal communicator, comprising:
a body portion configured for placement to an ear of a user;
a speaker disposed in the body portion;
an input device disposed on the body portion for allowing the user to enter information;
a flip element hingedly mounted on the body portion, wherein a position of the flip element determines an operating mode of the personal communicator from among a voice mode, a display mode, and a dual mode that supports simultaneous participation in telephone conversations and interaction with software application programs including text messaging applications.

2. The personal communicator as in claim 1 wherein the text messaging applications include email communications.

3. The personal communicator as in claim 1 wherein the text messaging applications include communications with a personal computer.

4. The personal communicator as in claim 1 wherein the text messaging applications include fax communications.

5. The personal communicator as in claim 1 further comprising a microphone disposed in the flip element.

6. The personal communicator as in claim 1 further comprising a display disposed on the flip element, the display being of sufficient size to present multiple lines of alphanumeric data simultaneously to the user.

7. The personal communicator as in claim 6 wherein the display is controlled to operate as an input device for entering information.

8. The personal communicator as in claim 1 further comprising a memory for storing application programs.

9. The personal communicator as in claim 8 further comprising a processor disposed in communication with the display, the processor executing application programs stored in the memory and being capable of receiving application programs by transmission from a remote storage device, wherein the received application programs may be executed partially by the processor and partially by a remote processing means and wherein the processor controls power states of components of the personal communicator in response to the operating mode.

10. A personal communicator, comprising:
a body portion containing a speaker, a microphone and an input device for allowing the user to enter information;
a first and second displays disposed on the body portion;
a memory for storing application programs; and
a processor disposed in communication with the first and second displays, the processor executing application programs stored in the memory to provide a dual mode of communication that supports simultaneous participation in telephone conversations and email communications.

11. The personal communicator as in claim 10 wherein the executing of the application programs controls information displayed on the first and second displays.

12. The personal communicator as in claim 11 wherein the first display is controlled to operate as an input device for entering information.

13. The personal communicator as in claim 11 wherein the dual mode of communications allows for SMS messaging.

14. The personal communicator as in claim 11 wherein the dual mode of communications allows for communications with a personal computer.

15. The personal communicator as in claim 11 wherein the first display is a touch sensitive device.

16. The personal communicator as in claim 10 wherein a mini disk drive may be connected to the personal communicator.

17. The personal communicator as in claim 10 wherein the dual mode of communications allows for fax communications.

18. A method of controlling a personal communicator comprising:
receiving both voice communications and text messages in a personal communicator that includes a flip element with a display screen hingedly attached to a body portion that is configured for placement to an ear of a user for voice communications;
in response to a position of the flip element, determining an operating mode of the personal communicator from among a voice mode, a display mode, and a dual mode that supports simultaneous participation in voice communications and text messaging applications; and
displaying the text message on the display screen while simultaneously participating in voice communications.

19. The method of controlling the personal communicator as in claim 18 wherein the text messaging is email communication.

20. The method of controlling the personal communicator as in claim 18 wherein the text messaging is SMS messaging.

* * * * *